April 25, 1933.  G. V. F. McCARTY  1,906,073
DOG COLLAR
Filed Feb. 9, 1931
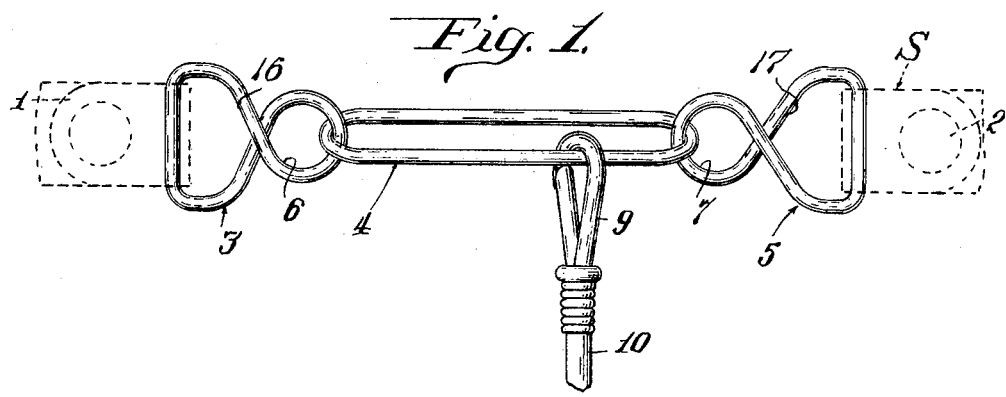
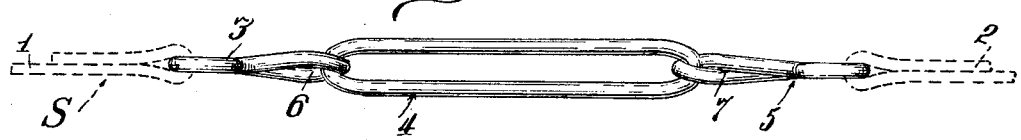
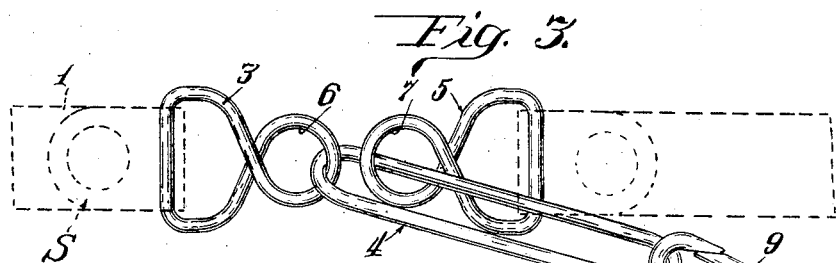
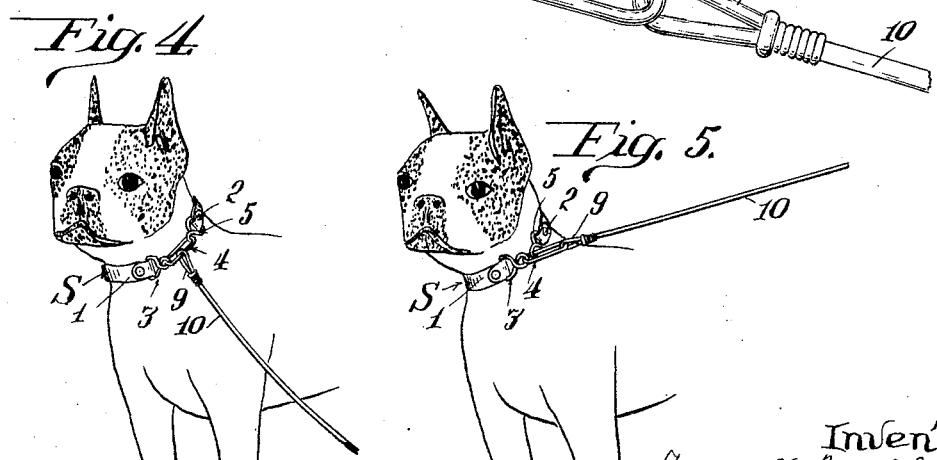

Patented Apr. 25, 1933

1,906,073

UNITED STATES PATENT OFFICE

GRACE V. F. McCARTY, OF PARK RIDGE, ILLINOIS

DOG COLLAR

Application filed February 9, 1931. Serial No. 514,460.

This invention relates to improvements in dog collars.

It is an object of the invention to provide a device of this kind which will satisfy the humane requirements for the treatment of animals.

Another object of the invention is to provide a device of this character which will automatically become tighter when the animals strain on the leash, without, however, causing excessive reduction of the circumference or diameter of the collar, so as to render the wearing of the dog collar more uncomfortable upon its being tightened up, but without actually choking the animal in a cruel or dangerous way.

Another object of the invention is to provide a device of this character which lends itself to a higher degree to the training of animals than the training collars which have heretofore been in use.

With these and numerous other objects in view, an embodiment of the invention is described in the following specification wherein reference is made to the accompanying drawing.

In the drawing:

Fig. 1 is a fragmentary side elevation of the collar in release condition;

Fig. 2 is an edge view of the collar in release condition;

Fig. 3 is a side elevation similar to the side elevation illustrated in Fig. 1, showing portions of the collar under strain;

Fig. 4 shows the collar applied to an animal under normal conditions, and

Fig. 5 shows the collar applied to an animal when the animal strains on the leash.

In some of the known training collars for dogs and the like, the circumference of the collar was reduced in proportion to the strain applied to the collar. According to the present invention, this possibility of tightening up the collar to a choking point is avoided, and a restricted reduction only can be applied, regardless of the strength with which the animal pulls on the leash.

For this purpose the two ends 1, 2 of the strap S are interconnected by a set of links 3, 4, 5 which can be moved towards each other a predetermined distance only to reduce thereby the circumferential length of the portion of the collar.

The collar is composed of the ordinary strap S, which in the embodiment shown is made of leather or some similar flexible material, and at the ends 1, 2 thereof links 3, 5 are connected with the strap, each link comprising two loops 6, 16 and 7, 17 respectively, the ends of the links being placed in overlapping or abutting relation at right angles to the axis of the strap S. The ends 1, 2 of the strap S are secured to these links in any desired way, as for instance by being sewed over the overlapping end portions of the pertaining link.

The two loops of these end links 3 and 5 are preferably produced by bending a piece of stiff wire or similar semi rigid material into loop form, with the legs of the wire crossing each other, thereby producing a loop at one end, and then again bending each leg at its end portion toward the other one, to form the other loop. Where the parts viewed in top plan view intersect each other, they are however not placed directly upon each other, but are spaced vertically from each other, to enhance the flexibility and movability of the entire structure.

The intermediate link 4 of the connecting structure between the two ends of the strap S is preferably an elongated link also made of wire or some similar material, and of a width large enough to readily permit the other two links 3, 5 to slide on either leg portion of the link 4, the entire structure being characterized by considerable looseness of the parts relatively to each other.

In the normal condition of the strap, as shown in Figs. 1 and 2, the loops 6 of the end links 3 and 5 will be positioned closely adjacent the bights or end portions of the central link 4. The latter also is the link to which the swivel snap hook 9 usually connected to the leash 10 is removably attached, this swivel hook being also adapted to slide freely on either leg of the central link 4 over the entire length thereof.

When the animal strains on the leash the leash will pull the central link 4 from the position shown in Fig. 1 to the position shown in Fig. 3, whereby the overall length of the collar composed of the strap S and the link structure 3, 4, 5 will be reduced by approximately the length of the intermediate link 4, and no further reduction can take place. No unlimited tightening of the collar can take place, so that the discomfort created by the animal pulling on the leash will not be excessive, and particularly no choking effect on the animal can be produced.

I claim:

1. In a device of the character described, the combination of a strap portion and a link structure connecting the ends of the strap portion, the link structure consisting of two end links and an intermediate rigid longitudinally extended link, each end link being formed into two loops consisting of intersecting leg portions of the same piece of wire, one loop of each link being interlinked with the intermediate rigid longitudinally extended link and the other loop of each end link being connected with an end of the strap portion.

2. In a device of the character described, the combination of a strap portion and a link structure connecting the ends of the strap portion, the link structure consisting of three serially connected links of which the central link is longitudinally extended, the end links comprising each a loop portion by means of which said end links are loosely interlinked with the central link, and the end links each comprising a loop attachment portion adapted for connection with the adjacent end of the strap portion.

3. In a device of the character described, the combination of a strap portion and a link structure connecting the ends of the strap portion, the link structure consisting of three serially connected links, the end links having each an inner loop portion by means of which they are loosely interlinked with the central link, said central link being rigid and longitudinally extended, each end link having an outer loop portion adapted for attachment to the ends of a strap portion, the three links being interconnected for rotary movement relatively to each other.

In witness whereof I affix my signature.

GRACE V. F. McCARTY.